(No Model.) 3 Sheets—Sheet 1.

C. W. CANFIELD.
GOLD SEPARATOR.

No. 540,144. Patented May 28, 1895.

Witnesses:
Geo. M. Anderson
Phil C. Masi.

Inventor:
C. W. Canfield
by E. W. Anderson
his Attorney.

(No Model.) 3 Sheets—Sheet 2.
C. W. CANFIELD.
GOLD SEPARATOR.
No. 540,144. Patented May 28, 1895.
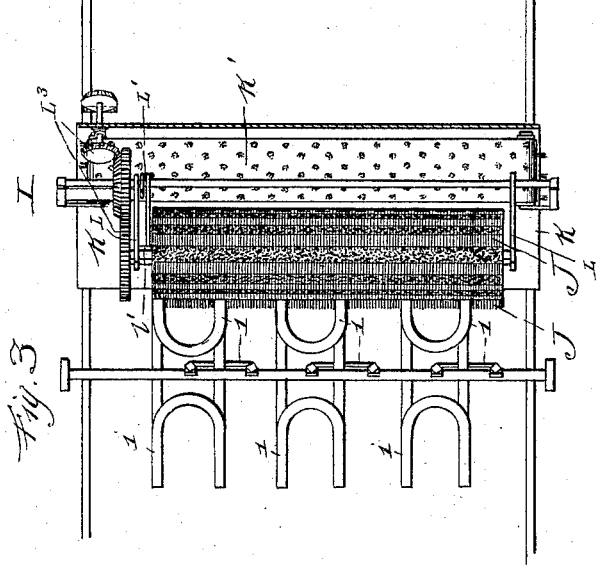
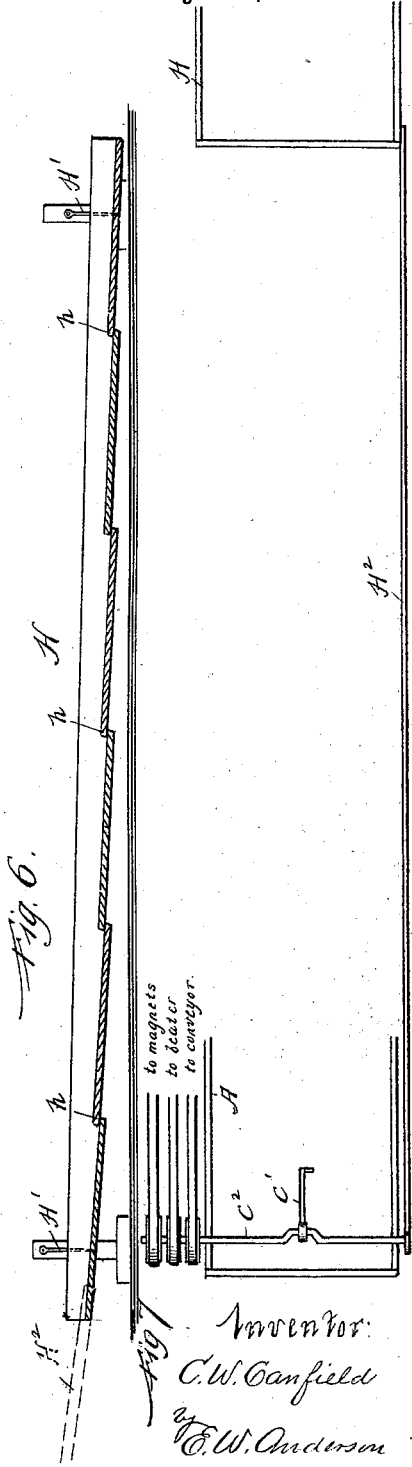
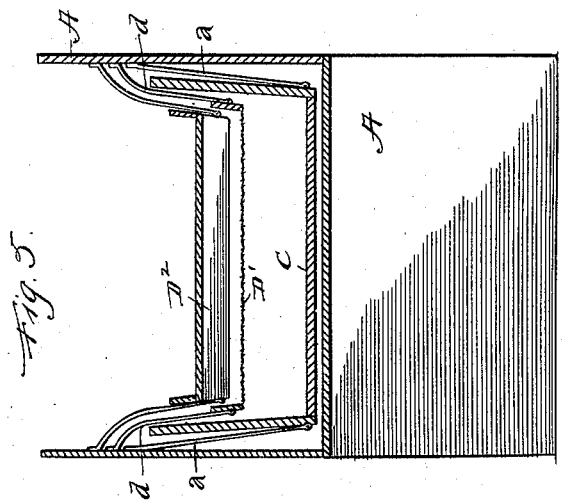
Witnesses:
Geo. M. Anderson
Phille Masi.
Inventor:
C. W. Canfield
by E. W. Anderson
his Attorney.

(No Model.) 3 Sheets—Sheet 3.
C. W. CANFIELD.
GOLD SEPARATOR.
No. 540,144. Patented May 28, 1895.
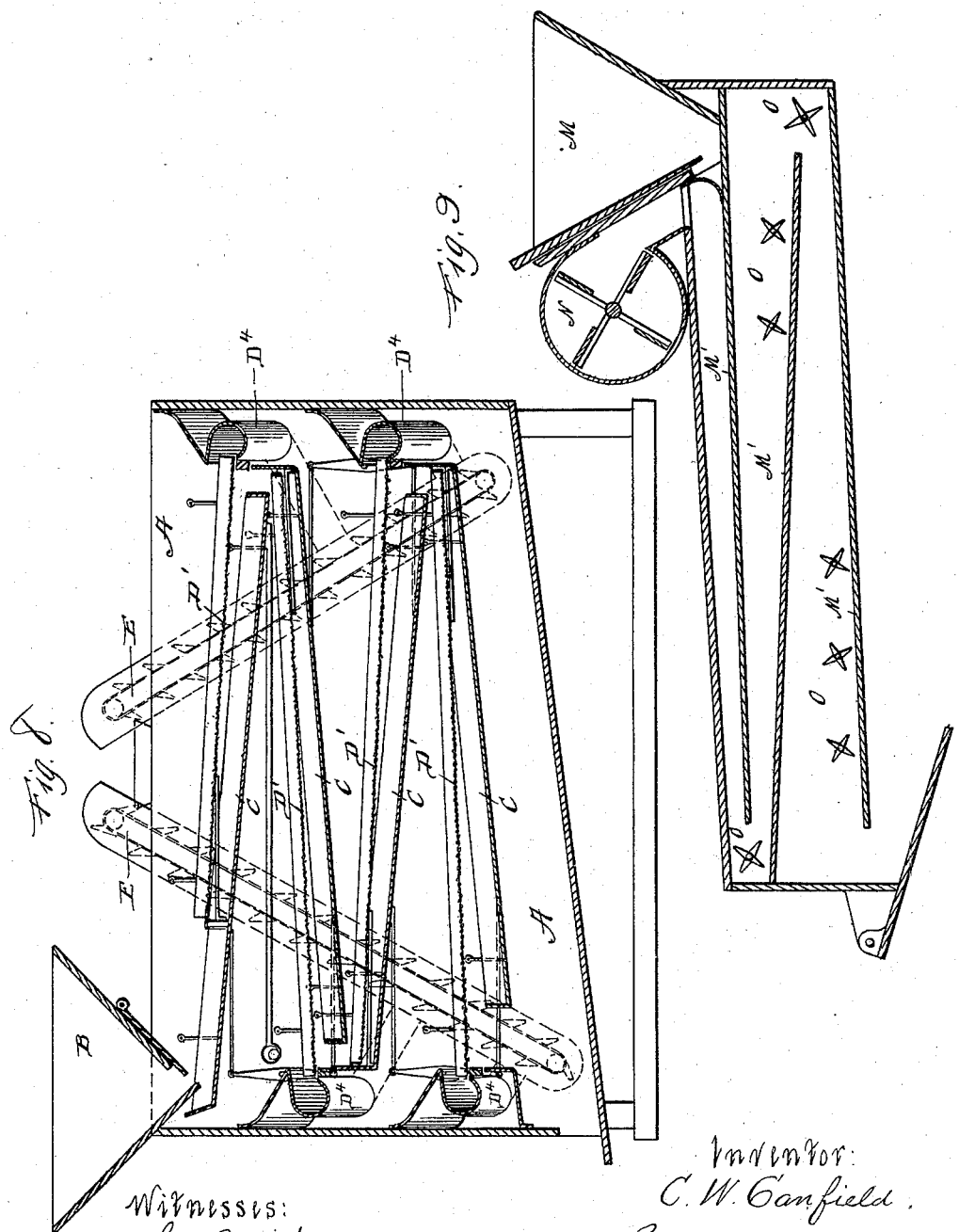

UNITED STATES PATENT OFFICE.

CARLTON W. CANFIELD, OF WINTHROP, MINNESOTA.

GOLD-SEPARATOR.

SPECIFICATION forming part of Letters Patent No. 540,144, dated May 28, 1895.

Application filed November 17, 1894. Serial No. 529,167. (No model.)

*To all whom it may concern:*

Be it known that I, CARLTON W. CANFIELD, a citizen of the United States, and a resident of Winthrop, in the county of Sibley and State of Minnesota, have invented certain new and useful Improvements in Gold-Separators; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
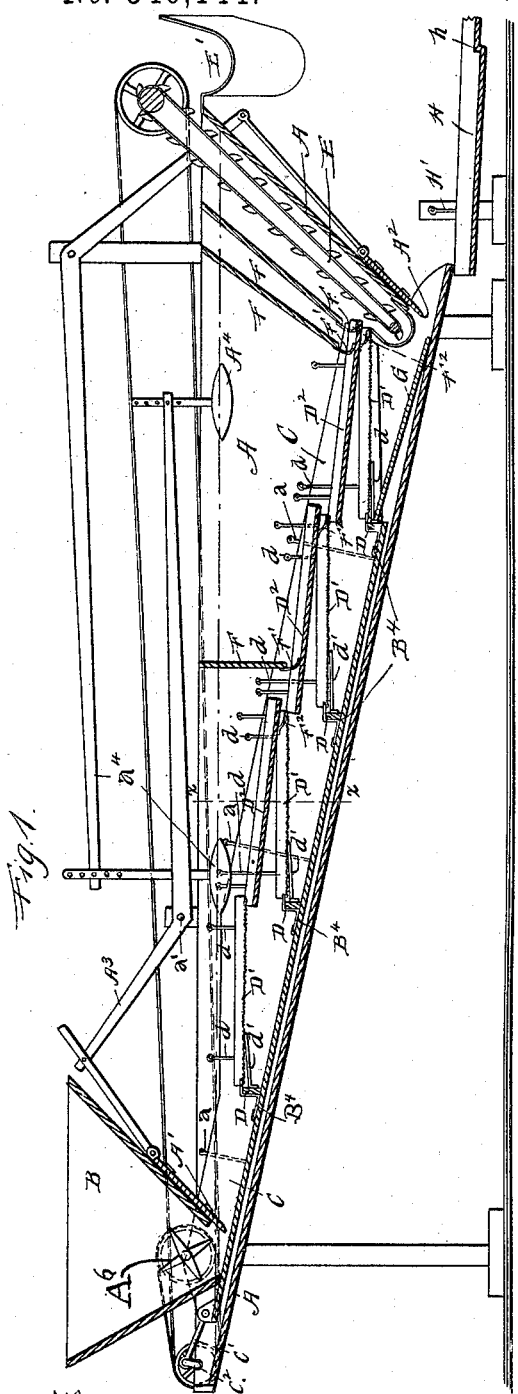
Figure 4:
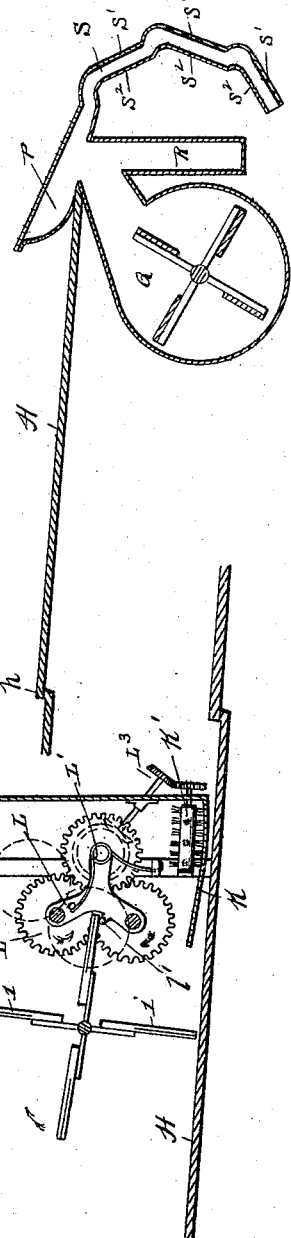
Figure 2:
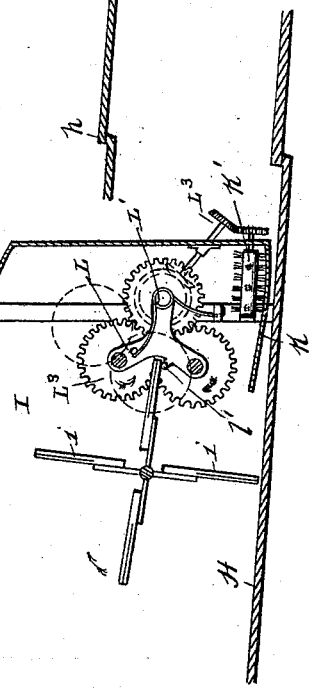

Figure 1 is a central vertical longitudinal section through machine with sluice-box H broken. Fig. 2 is a transverse vertical section of the devices for the separation of black sand, the section being taken near one end, just inside of the brush-supporting frame. Fig. 3 is a plan view of the same with the top portion of the pan K removed. Fig. 4 is a sectional view of appliance for recovering fine gold. Fig. 5 is an enlarged section on line $xx$, Fig. 1. Fig. 6 is a vertical longitudinal section of sluice-box H, the end of pitman-bar showing in dotted lines. Fig. 7 is a plan view indicating the driving connections of parts. Fig. 8 is a sectional view of modified form of invention. Fig. 9 is a sectional view of drying appliance.

This invention has relation to certain new and useful improvements in machines for effecting the separation of gold and other heavy metals from the ore-bearing material, the object being to provide a machine whereby such separation can be readily, thoroughly and economically accomplished; and the invention consists in the novel construction and combination of parts, all as hereinafter described and pointed out in the appended claims.

Referring to the accompanying drawings, the letter A designates a tank of suitable character, having near one end a hopper B arranged to discharge upon the upper portion of an inclined tray or sluice box C, supported longitudinally in said tank. The supports $a$, for said tray or box are of oscillating or spring character for the purpose of permitting it an endwise and rising vibratory movement, which may be imparted by means of a pitman $C'$, actuated by a shaft $C^2$, or by other suitable means. Along the upper surface of said tray or box are placed at intervals a series of transverse dams D, which actuate by means of bar $d'$ each a screen $D'$ which extends horizontally therefrom to a point substantially over the next succeeding dam. Said screens are supported by spring or oscillatory arms $d$, which permit the endwise and rising movement of the screens, caused by the pitman, and the inclination of the said arm. The intervals between the dams constitute a series of inclined planes. Each succeeding screen is of finer mesh than the one preceding it.

$B^4$ represents removable pans or trays in which the gold is deposited at the dams. Above each of said screens, with the exception of the first, is a table or platform $B^2$, each of which is inclined and is arranged to discharge upon the next succeeding one of the series. The last platform or table is arranged to discharge into a conveyer E, which discharges onto a side delivery chute, $E'$ at the upper portion of the tank.

F designates partitions which extend transversely across the tank and supported from the cover thereof, their purpose being to prevent violent circulation of the water with which the tank is designed to be nearly filled, and give a gentle current from the point where the water and material enter the tank from the hopper at the gate $A'$, to where the fine metal is discharged at the opposite end of the tank at the gate $A^2$. Attached to the lower portion of end of the partitions and resting upon the platforms $D^2$, are yielding flaps $F'$, $F^2$, and to the under side of the said platforms and resting upon the screens are similar flaps also designated by the letters $F'$ $F^2$. All the flaps $F'$ are for the purpose of preventing too violent circulation of the water, while permitting the passage of the material thereunder. The flaps $F^2$, which are attached to the last partition F and to the under side of the last platform $D^2$, are for the purpose of preventing fine particles of metal from floating off the last platform and screen into the conveyer E.

The gate $A'$ is connected to a lever $A^3$, fulcrumed upon the tank at $a'$, and actuated by a float $A^4$ in the tank. As the water rises or falls in the tank, said float operates to close or open the gate and thereby regulates the depth of water in the tank. The gate $A^2$ is also operated by a similar float and lever device $a^4$.

At the lower end of the tray or box C is an inclined delivery board G which receives the material carried over the last dam D, and carries it to the bottom of the tank, whence it passes out through the gate $A^2$, into a sluice box H. The inclined bottom of this sluice box is formed to present a series of transverse ledges $h$, the abrupt faces of which are toward the receiving end of the box. Said box H is hung by means of spring arms $H'$, and is designed to be jigged to a gentle endwise movement by pitman bar $H^2$ driven by $C^2$.

The operation of the machine as thus far described is as follows: The material (sand, gravel, &c., with water) is put into the hopper from which it passes through the gate $A'$ to the tray or box C. If there is clay in the material being treated, one or more beaters $A^6$ are usually provided in the throat of the hopper. With material of a lighter, looser character, such beater or beaters may be omitted. The material slides down the box C to the first dam, during which movement any larger nuggets of gold or other metal will settle to the bottom of the box and will be caught by the dam over which they cannot rise. The lighter parts flow over the dam and onto the first screen $D'$, which effects a second separation, the coarser parts being carried over the screen onto the first table $D^2$, and the finer parts passing through the screen into the next section of the sluice box down which they move to the next dam where the operation is repeated, as it is for each dam of the series. When the last screen is reached, but comparatively little fine stuff will remain, the coarse stuff having been removed and carried off by the conveyer. This remaining fine material passes out at the gate $A^2$ into the sluice box H. In passing through this box, owing to the fine character of the material, but slow movement of the water and jig motion is required to carry off the balance of the sand and other foreign matter, and allow the fine and flat gold to settle and be caught and retained by the ledges, or it may be by quicksilver, or on amalgamation plates in the bottom of said box.

When black sand is present in the material carried over to the sluice box H, one or more magnet devices I, are provided, consisting each of a rotary shaft to which are secured at suitable distances apart, a series of magnets $i$. This shaft with its magnets is rotated against the current and the adhering particles of sand are removed from the magnets by means of suitable rotary brushes J, and are deposited in a pan K from which they are removed by a side acting brush $K'$. Said brushes are journaled in frames L and are held up by a spring $L'$ which normally holds them in the positions indicated in dotted lines, Fig. 2, until caught by the magnets and moved to the positions shown in full lines in said Fig. 2.

As each magnet comes in contact with the brushes, it is received between them in the manner shown in Fig. 2, the brushes moving down with the magnet against the tension of the springs $L'$ until the magnet passes them. A pin $l'$ is provided on one of the frames L against which the end magnets catch to assist in bringing the brushes down. $L^3$ designates gear for driving the brushes J and $K'$.

When the material is to be treated in a dry state, the same mechanism may be employed with the exception that where desired a suitable frame may be substituted for the tank. In this process where the material is damp, it is desirable to dry it somewhat before passing it to the separator, in which case the device shown in Fig. 9 may be substituted for the hopper B. Said device comprises a hopper M which discharges the material onto a series of inclined chutes or pans $M'$, the last one of which discharges onto the box C. In passing over these pans the material is subjected to the action of a blast of heated air from a blower N. Where clay is mixed with the dirt, a series of beaters O is also preferably employed, said beaters being arranged to act upon the material as it passes over said pans. In this dry process some very fine gold may remain in the sand at the end of the box H, and to recover this gold I provide the appliance shown in Fig. 4. Said appliance comprises a hopper P into which the sand is discharged from the box H, the discharge being met at this point by a blast from a fan Q. The heavier particles not affected by the blast fall into a pit or pocket R, while the lighter parts pass into a downwardly curved, contracted chute S, having upon one side thereof a series of amalgamation plates $S'$, set at different angles, and upon the other side a series of curved or inclined surfaces $S^2$. The dust and fine particles of gold are blown back and forth against these plates and are recovered thereby.

Fig. 8 shows a modified form of the separator the principle of which is the same as that of the machine above described. This form is more especially designed to secure greater compactness, which is obtained by forming the box in sections placed one above the other with screens $D'$, and discharging one upon another, adjacent sections being oppositely inclined. With this form it becomes necessary to employ two of the conveyers E, one of which receives the coarser parts from the screens at each end portion of the separator. The arrangement and operation of this form of the machine will be readily understood without detailed description. In place of the tank shown, a suitable frame may be employed when the machine is intended to treat dry material. The platforms $D^2$ are omitted in this form, the screen being arranged to discharge directly into pockets $D^4$ which deliver the coarse material to the conveyers. The inclination of the bottom of the sluice box H should be sufficiently slight to cause only a slow movement of the material thereover, in order that the valuable metal may have ample time to settle and be caught by the ledges *h* or the amalgamation plates.

Having thus described my invention, what I claim as new, and desire to secure by Letters Patent, is—

1. In a gold separator, the combination of a tank or frame, a series of inclined planes movably supported therein, a series of transverse dams or obstructions on said planes, a series of screens supported over said planes, and a sluice box arranged to receive the discharge from the last incline, of the series and having means for recovering the gold remaining in the material discharged therein, substantially as specified.

2. The combination of a sluice box having a series of inclined planes therein, dams obstructing said planes, a graduated series of separating screens supported over said inclines, a series of inclined platforms supported over said screens, a vibratory sluice box arranged to receive the discharge from the last incline, means for removing the coarse material from the said platforms, and means for recovering the fine gold contained in the material discharged on said vibratory sluice box, substantially as specified.

3. In a gold separator, the combination with a tank or frame, a series of inclined planes movably supported therein, and obstructed by transverse dams, a feeding appliance arranged to discharge upon the upper plane of the series, a series of graduated screens supported over said planes, a series of platforms supported over the screens, and means for removing the coarser material from said platforms, of a sluice box which receives the discharge from the last of said inclines, said sluice box having an inclined bottom broken by a series of transverse ledges, substantially as specified.

4. In a gold separator, the combination with a tank or frame, the inclined planes supported therein, their dams, the graduated screens, and the inclined platforms, of the vibratory sluice box arranged to receive the discharge from the last plane of the series, means carried by said box for recovering the fine gold discharged therein, and one or more rotary magnet devices, working in close relation to the bottom of said box, substantially as specified.

5. In a gold separator, the combination with a frame or tank, and the separating appliances supported therein, of a vibratory sluice box arranged to receive the fine material from said separating appliances, a hopper into which said box is arranged to discharge, a blower for directing a blast against the discharge at this point, and a contracted tortuous chute into which the finer material is directed by the blast, said chute having a series of amalgamation plates placed at different angles, substantially as specified.

6. In a gold separator, the combination with the sluice box H, which receives the fine gold and sand from the separator proper, of one or more rotary magnet devices arranged to operate in close relation to the bottom of said box, means for removing the adhering particles from the magnets, a hopper into which said box discharges, a blower for creating a blast at the point of discharge and a tortuous chute into which the fine material is directed by the blast, said chute having a series of amalgamation plates, substantially as specified.

7. The combination with the vibratory sluice box H having means in its bottom for catching and retaining the gold, of the hopper P into which said box is arranged to discharge, the fan Q, the pit or pocket R, and the contracted chute S having the amalgamation plates S', and the curves or inclines $S^2$, substantially as specified.

8. In a gold separator, the combination of a tank A, a vibratory sluice box supported therein, and having a series of inclined planes obstructed by dams, a hopper arranged to discharge onto the upper plane of the series, a graduated series of separating screens supported over said planes, a series of inclined platforms supported over said screens, a conveyer for removing the coarse material from said platforms and screens, and the transverse partitions and flaps for preventing rapid circulation in said tank, substantially as specified.

9. In a gold separator, the combination with the tank A, the sluice box B, its inclined plane and dams, the screens D' and the platforms $D^2$, of the hopper arranged to discharge onto the first inclined plane of the series, the gate controlling the discharge of said hopper, the lever to which said gate is connected, and the float for actuating said lever, substantially as specified.

In testimony whereof I affix my signature in presence of two witnesses.

CARLTON W. CANFIELD.

Witnesses:
 FRED J. ZITLOW,
 C. A. BENSON.